United States Patent
Liao

(10) Patent No.: US 9,268,419 B2
(45) Date of Patent: Feb. 23, 2016

(54) DISPLAY PANEL AND DRIVING CIRCUIT THEREOF

(71) Applicant: SITRONIX TECHNOLOGY CORP., Hsinchu County (TW)

(72) Inventor: Min-Nan Liao, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 13/687,134

(22) Filed: Nov. 28, 2012

(65) Prior Publication Data

US 2013/0278639 A1 Oct. 24, 2013

Related U.S. Application Data

(60) Provisional application No. 61/636,833, filed on Apr. 23, 2012.

(51) Int. Cl.
*G09G 3/36* (2006.01)
*G06F 3/038* (2013.01)

(52) U.S. Cl.
CPC .............. *G06F 3/038* (2013.01); *G09G 3/3685* (2013.01); *G09G 3/3688* (2013.01); *G09G 3/3696* (2013.01); *G09G 2320/0276* (2013.01)

(58) Field of Classification Search
CPC .......... G09G 2320/0276; G09G 3/038; G09G 3/3688; G09G 3/3696; G09G 3/3685
See application file for complete search history.

(56) References Cited

U.S. PATENT DOCUMENTS

| 6,806,861 | B1 | 10/2004 | Sakaguchi et al. | |
|---|---|---|---|---|
| 2002/0186230 | A1 | 12/2002 | Kudo et al. | |
| 2006/0125761 | A1* | 6/2006 | Ahn | 345/98 |
| 2006/0152470 | A1 | 7/2006 | Kim | |
| 2007/0035495 | A1* | 2/2007 | Chang | 345/87 |
| 2007/0132684 | A1 | 6/2007 | Baek et al. | |
| 2007/0164963 | A1 | 7/2007 | Kim et al. | |
| 2007/0262972 | A1 | 11/2007 | Nakata | |
| 2008/0211703 | A1* | 9/2008 | Tsuchi | 341/144 |
| 2009/0289930 | A1* | 11/2009 | Nishimura | 345/211 |
| 2010/0001984 | A1 | 1/2010 | Kim et al. | |
| 2010/0060621 | A1* | 3/2010 | Hsu | 345/211 |
| 2011/0032279 | A1 | 2/2011 | Kim et al. | |
| 2011/0050671 | A1* | 3/2011 | Sah | 345/211 |
| 2012/0019569 | A1* | 1/2012 | Byun | 345/690 |

(Continued)

FOREIGN PATENT DOCUMENTS

| CN | 1632848 A | 6/2005 |
|---|---|---|
| CN | 1954353 A | 4/2007 |

(Continued)

*Primary Examiner* — Kenneth Bukowski

(74) *Attorney, Agent, or Firm* — Rosenberg, Klein & Lee

(57) ABSTRACT

The present relates to a display panel and the driving circuit thereof. A scan driving circuit of the driving circuit of the display panel according to the present invention produces a plurality of scan signal for scanning a plurality of pixel structures of the display panel. In addition, a data driving circuit produces a plurality of data signals corresponding to the plurality of scan signals and transmits the plurality of data signals to the plurality of pixel structures, where a common electrode of the plurality of pixel structures is coupled to a ground. Moreover, the data driving circuit according to the present invention adjusts the signal levels of a plurality of gamma voltages according to a compensation signal of a compensation circuit, and thus further adjusting the levels of the data signals.

12 Claims, 14 Drawing Sheets

(56) References Cited

U.S. PATENT DOCUMENTS

2012/0038686 A1    2/2012   Liu et al.
2012/0161660 A1*   6/2012   Joo ............................ 315/240

FOREIGN PATENT DOCUMENTS

| | | |
|---|---|---|
| CN | 101290744 A | 10/2008 |
| CN | 101408705 A | 4/2009 |
| CN | 101739973 A | 6/2010 |
| CN | 102013237 A | 4/2011 |
| JP | 2000-267635 A | 9/2000 |
| JP | 2002-214582 A | 7/2002 |
| JP | 2002-229520 A | 8/2002 |
| JP | 2005-49868 A | 2/2005 |
| JP | 2007-25239 A | 2/2007 |
| KR | 10-2006-0132942 A | 12/2006 |
| KR | 10-2007-0034656 A | 3/2007 |
| KR | 10-2007-0076719 A | 7/2007 |
| KR | 10-2008-0105642 A | 12/2008 |
| KR | 10-2009-0005424 A | 1/2009 |
| KR | 10-2010-0005515 A | 1/2010 |
| KR | 10-2011-0014428 A | 2/2011 |
| TW | 201102995 A | 1/2011 |
| TW | 201113855 A | 4/2011 |
| TW | M408885 U1 | 8/2011 |
| TW | 201207805 A | 2/2012 |
| TW | I447687 B | 8/2014 |

\* cited by examiner

DISPLAY PANEL AND DRIVING CIRCUIT THEREOF

REFERENCE TO RELATED APPLICATION

This application is based on Provisional Patent Application Ser. No. 61/636,833, filed 23 Apr. 2012, currently pending.

FIELD OF THE INVENTION

The present invention relates generally to a display panel and the driving circuit thereof, and particularly to a display panel capable of improving display quality and reducing flash and the driving circuit thereof.

BACKGROUND OF THE INVENTION

Modern technologies are developing prosperously. Novel information products are introduced daily for satisfying people's various needs. Early displays are mainly cathode ray tubes (CRTs). Owing to their huge size, heavy power consumption, and radiation hazardous to the heath of long-term users, traditional CRTs are gradually replaced by liquid crystal displays (LCDs). LCDs have the advantages of small size, low radiation, and low power consumption, and thus becoming the mainstream in the market.

LCDs control the transmittance of liquid crystal cells according to data signals for displaying images. FIG. 1 shows a schematic diagram of the display panel and its plurality of pixel structures according to the prior art. As shown in FIG. 1, the display panel comprises a plurality of pixel structures 10' and a driving chip 20'. The driving chip 20' produces a driving signal for driving the plurality of pixel structures 10'. Where each of the pixel structures 10' includes a thin film transistor (TFT) 12' and a storage capacitor 14'. The gate of the TFT 12' is coupled to a scan line; the source of the TFT 12' is coupled to the driving chip 20'; and the drain of the TFT 12' is coupled to the storage capacitor 14'. Because an active-matrix LCD adopts active switching devices, it is advantageous in displaying moving pictures. TFTs 12' are mainly used as the switching devices in active-matrix LCDs.

In addition, the applications of TFT LCDs are extensive. Their driving method is to turn on the internal cell using the gate. Then the source is used for supplying the accurate voltage for controlling the orientation of the liquid crystal in the display panel for displaying images. FIG. 2 shows a schematic diagram of the plurality of pixel structures of the display panel and FIG. 3 shows waveform of the driving signal for the plurality of pixel structures according to the prior art. As shown in the figures, the driving chip 20' will produce a plurality of scan signals G0, G1, ..., Gn and transmit the plurality of scan signals G0, G1, ..., Gn sequentially to a plurality of scan lines Ga1, Ga2, ..., Gan of the plurality of pixel structures. As any of the scan lines is activated, namely, the scan signal reaching VGH, a plurality of data lines S0, S1, ..., Sn supply the corresponding voltages of image data to the pixel structures 10' of the display panel and thus displaying the image.

There exists a parasitic capacitor 16' between the TFT 14' of the plurality of pixel structures 10' and the storage capacitor 14' such as Cs1, Cs2, Cs3, and Cs4 in FIG. 2. Thereby, when the scan signal G0 is cut off, the storage voltages across the storage capacitors Cs1, Cs2 will be shifted downwards by a shift voltage Vsft owing to the parasitic capacitors 16', which is approximately 1 volt. The driving chip 20' will provide a reference voltage DC to a common electrode 18' of the plurality of pixel structures according to the shift voltage Vsft, which is used as a common voltage. Hence, when the scan signal G0 is cut off and the storage voltages across the storage capacitors Cs1, Cs2 are shifted by a shift voltage Vsft owing to the parasitic capacitors 16', the storage voltages across the storage capacitors Cs1, Cs2 are still symmetrical to the common voltage of the common electrode 18' while displaying identical grayscale.

Nonetheless, the parasitic capacitors 16' vary over the display panel. As the storage voltages across the storage capacitors Cs1, Cs2 are shifted by a shift voltage Vsft, the shift voltage Vsft will be slightly different. Thereby, while displaying identical grayscale, the storage voltages across the storage capacitors Cs1, Cs2 are not symmetrical to the common voltage of the common electrode 18' and thus producing the flash phenomenon. For overcoming this problem, according to the prior art, the driving chip 20' needs to provide the reference voltage DC to a common electrode 18' of the plurality of pixel structures, as shown in FIG. 4, and the voltage tuning function, which will lead to increases in circuit area and power consumption.

Moreover, as the scan signal G0 switches TFTs, as shown in FIG. 5, the voltage level of the common voltage on the common electrode of the pixel structures are influenced, which further influences the displaying quality. Besides, because the plurality of pixel structures of the display panel is not grounded directly, when the panel is influenced by electrostatic charges, the charges have to be released through the contact with the common electrode and via the electrode static discharge circuit 30', as shown in FIG. 6. Consequently, the electrostatic charges are not released to the ground directly; the electrostatic charges still have the possibility of damaging the circuitry of the driving chip 20' via the common electrode. Thereby, the endurance of the display panel module according to the prior art to electrostatic charges are inferior.

Accordingly, the present invention provides a novel display panel and the driving circuit thereof for avoiding an extra reference voltage to a common electrode of the plurality of pixel structures and thus reducing circuit area and power consumption. In addition, the displaying quality can be enhanced by eliminating the influence of the switching of scan signal on the common electrode. Furthermore, the endurance of the display panel on electrostatic charges can be improved as well. Thereby, the problems described can be solved.

SUMMARY

An objective of the present invention is to provide a display panel and the driving circuit thereof. By coupling a common electrode of a plurality of pixel structures of the display panel to the ground, the voltage at the common electrode will not be influenced as the scan signal is switching. Thereby, the displaying quality can be improved.

Another objective of the present invention is to provide a display panel and the driving circuit thereof. By coupling a common electrode of a plurality of pixel structures of the display panel to the ground, the electrostatic charges can be guided to the ground directly for improving the endurance on electrostatic charges.

Still another objective of the present invention is to provide a display panel and the driving circuit thereof. By using a compensation signal of a compensation circuit, the signal levels of a plurality of gamma voltages can be adjusted without producing an extra reference voltage for the common electrode. Thereby, the circuit area, and hence the cost, can be reduced.

The driving circuit of the display panel according to the present invention comprises a scan driving circuit and a data driving circuit. The scan driving circuit produces a plurality of scan signals for scanning a plurality of pixel structures of the display panel. The data driving circuit produces a plurality of data signals for transmitting the plurality of data signals to the plurality of pixel structures when the plurality of pixel structures are scanned. A common electrode of the plurality of pixel structures is coupled to a ground. Thereby, by coupling the common electrode of the plurality of pixel structures of the display panel to the ground, the voltage at the common electrode will not be influenced as the scan signal is switching and hence improving the displaying quality. In addition, by coupling the common electrode of the plurality of pixel structures of the display panel to the ground, the electrostatic charges can be guided to the ground directly for improving the endurance on electrostatic charges.

Furthermore, the data driving circuit according to the present invention comprises a compensation circuit, a gamma voltage generating circuit, a plurality of digital-to-analog converters, and a plurality of buffer units. The compensation circuit produces a compensation signal. The gamma voltage generating circuit generates a plurality of gamma voltages according to the compensation signal and gamma curve data. The plurality of digital-to-analog converters select a portion of the plurality of gamma voltages to output according to the plurality of display signals. The plurality of buffer units correspond to the plurality of digital-to-analog converters and produce a plurality of driving signals according to the plurality of gamma voltages output by the plurality of digital-to-analog converters for driving the display panel. Where the compensation signal of the compensation circuit adjusts the signal levels of the plurality of gamma voltages; a ground of the data driving circuit is coupled to a common electrode of the display panel. Accordingly, by using the compensation signal of the compensation circuit, the signal levels of the plurality of gamma voltages can be adjusted without producing an extra reference voltage for the common electrode. Thereby, the circuit area, and hence the cost, can be reduced.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
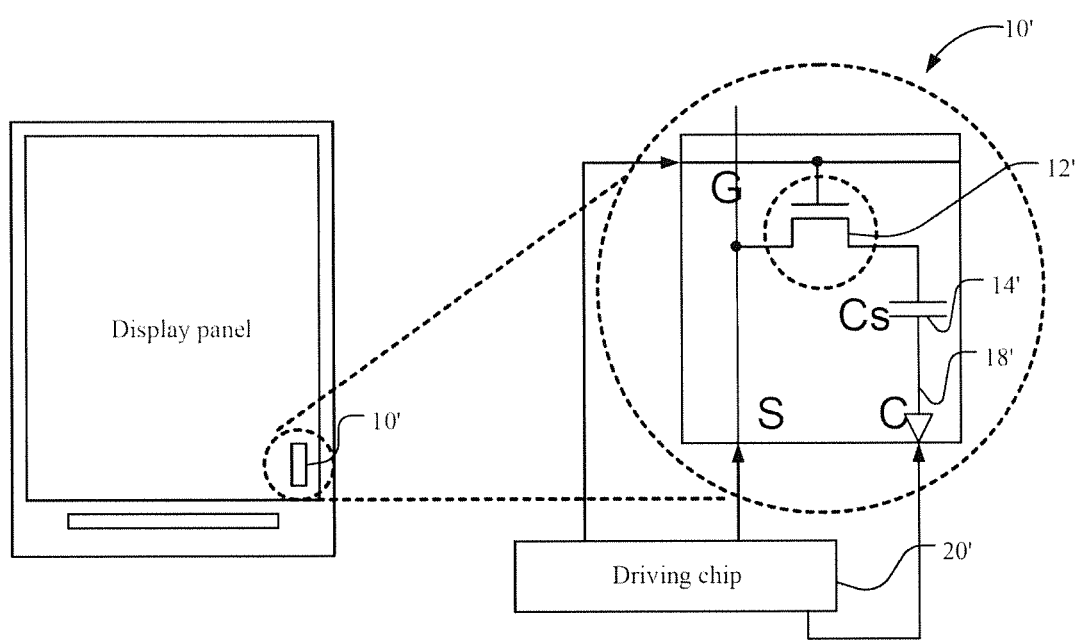
FIG. 1 shows a schematic diagram of the display panel and its plurality of pixel structures according to the prior art.
Figure 2:
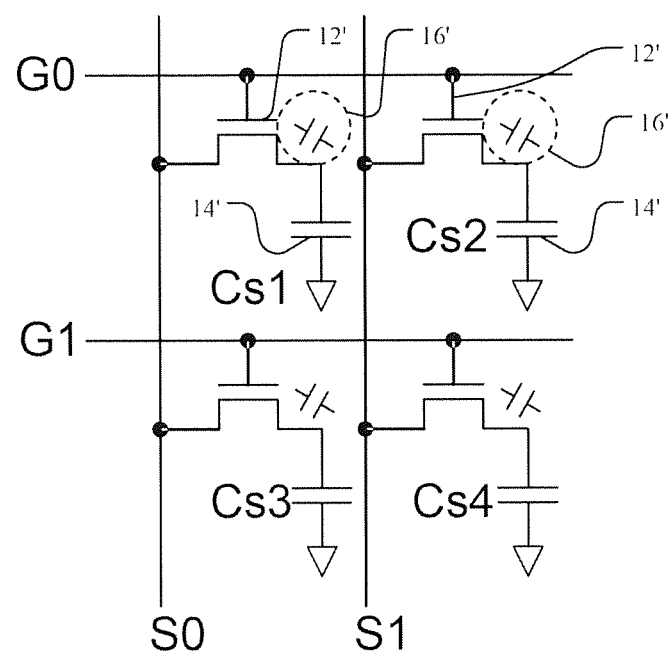
FIG. 2 shows a schematic diagram of the plurality of pixel structures of the display panel according to the prior art.
Figure 3:
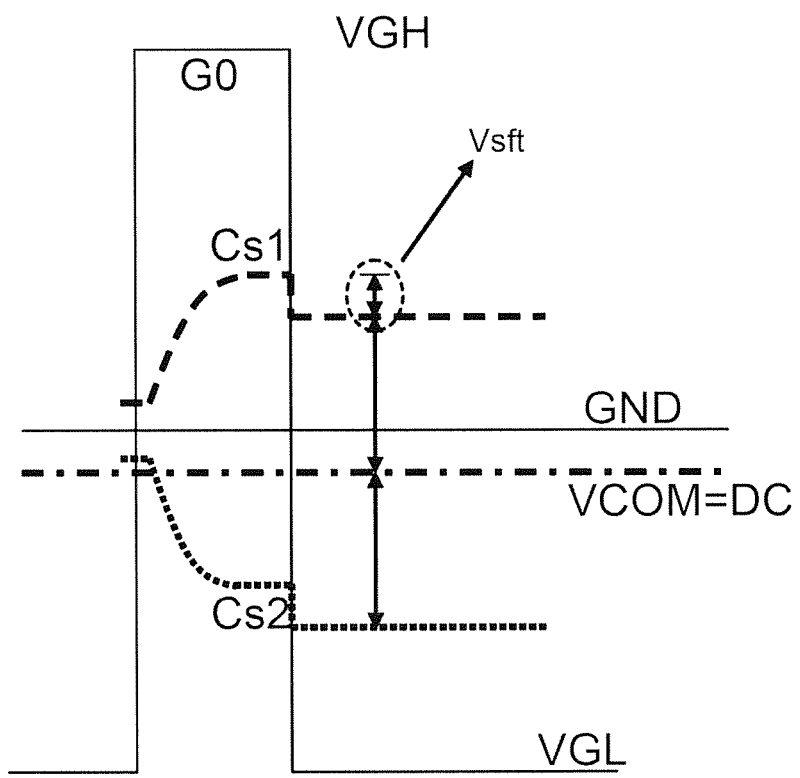
FIG. 3 shows waveform of the driving signal for the plurality of pixel structures according the prior art.
Figure 4:
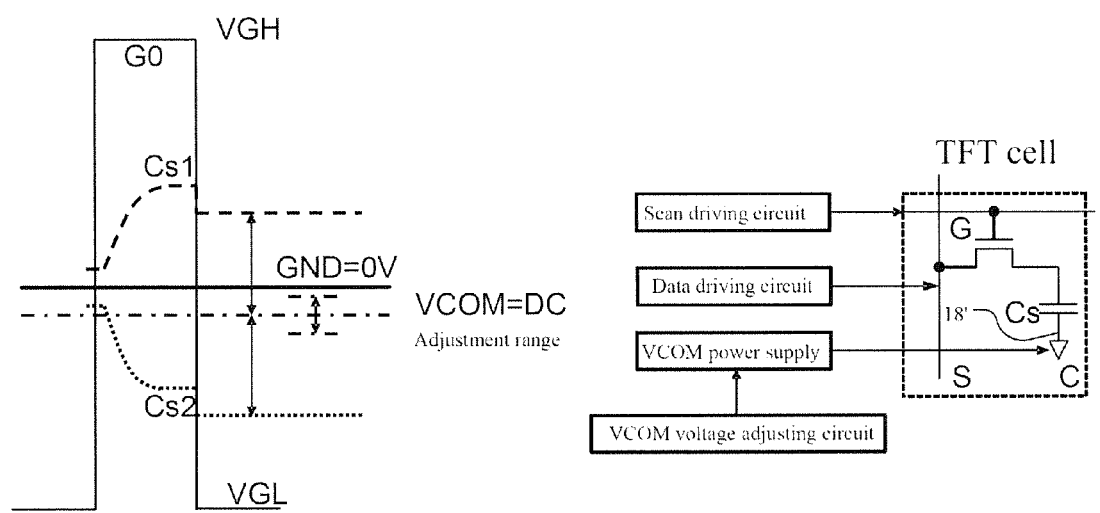
FIG. 4 shows a schematic diagram of the driving circuit driving the plurality of pixel structures of the display panel according to the prior art.
Figure 5:
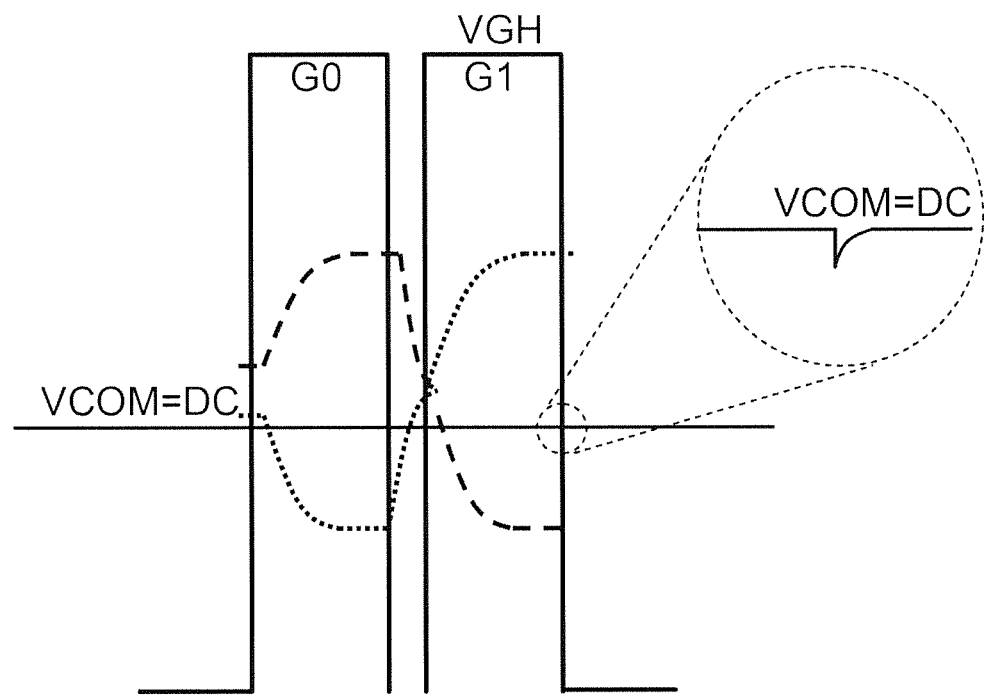
FIG. 5 shows the waveform of the common voltage influenced by switching the level of the scan signal according to the prior art.
Figure 6:
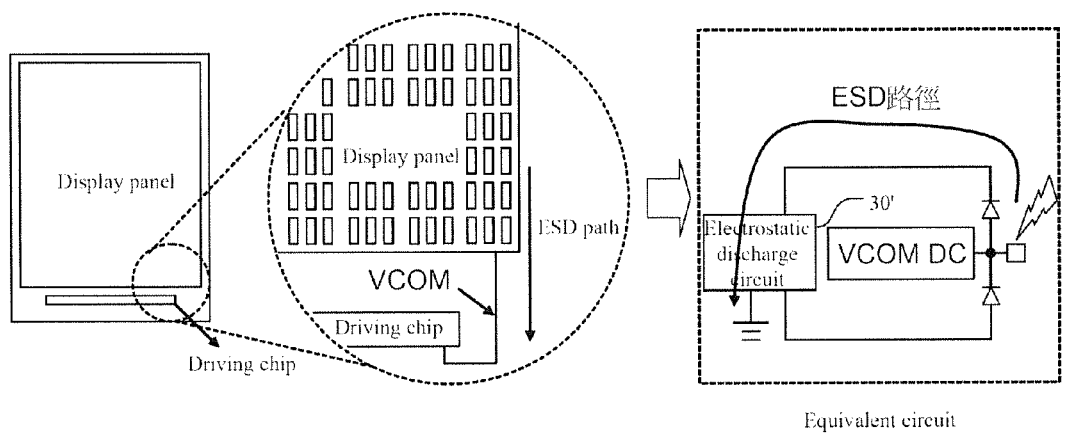
FIG. 6 shows a schematic diagram of electrostatic discharge of the display panel according to the prior art.
Figure 7:
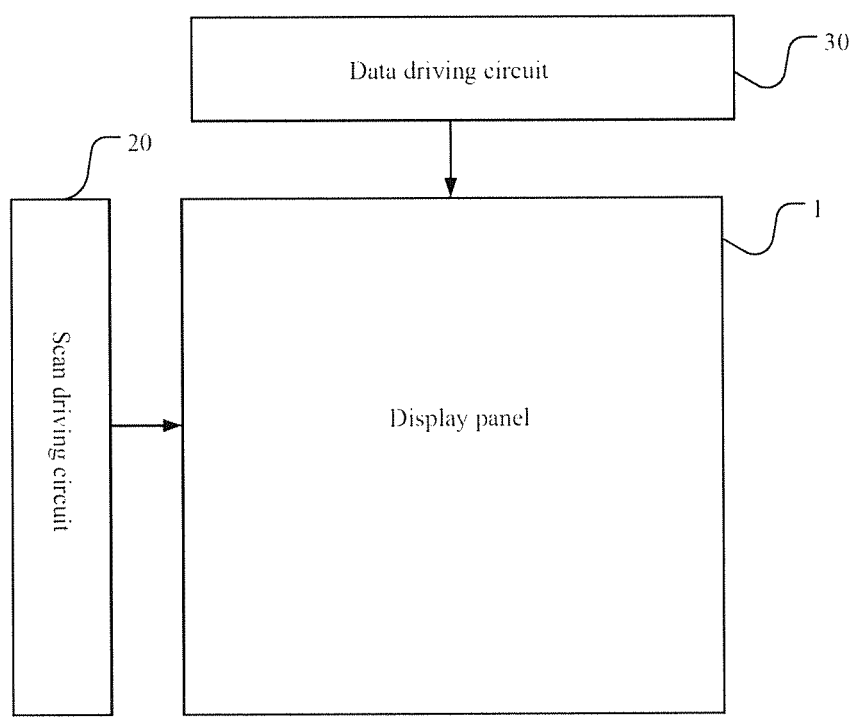
FIG. 7 shows a block diagram of the display panel according to an embodiment of the present invention.
Figure 8A:
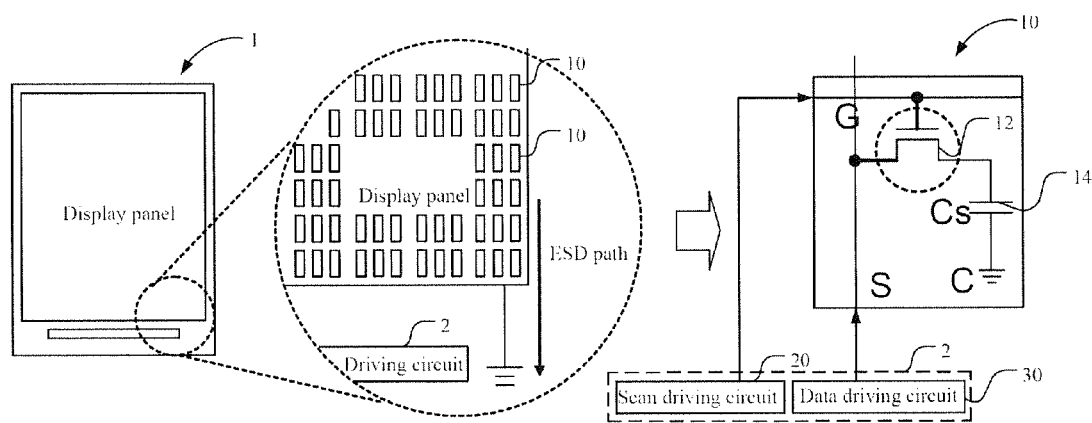
FIG. 8A shows a schematic diagram of the display panel according to an embodiment of the present invention.

FIGS. 7 and 8A show schematic diagrams of the display panel according to an embodiment of the present invention. As shown in the figures, the display device according to the present invention comprises a display panel 1 and a driving circuit 2. The display panel 1 includes a plurality of pixel structures 10, which are located at the intersections of the scan lines and data lines of the display panel 1. The pixel structure 10 includes a transistor 12 and a storage capacitor 14. The transistor 12 has a gate, a source, and a drain. The transistor 12 is a switch. The gate of the transistor 12 is coupled to the scan line of the display panel 1 for controlling the turning on and cutoff of the transistor 12. The source of the transistor 12 is coupled to the data line of the display panel 1 for receiving the data signal according to the turning on of the transistor 12. The drain of the transistor 12 is coupled to a terminal of the storage capacitor 14. The other terminal of the storage capacitor 14, namely, the common electrode COM, is coupled to a ground. Here the storage capacitor 14 is a liquid crystal capacitor.

Because of the common electrode COM of the plurality of pixel structures 10 is coupled to the ground, a common voltage VCOM of the common electrode COM is zero. Thereby, when the electrostatic charges appear and enter the display panel 1, the electrostatic charges will be led to the ground via the common electrode COM of the plurality of pixel structures 10. Accordingly, by coupling the common electrode COM of the plurality of pixel structures 10 of the display panel 1 to the ground, the electrostatic charges can be guided to the ground directly and thus improving the endurance of the present invention on electrostatic charge.

In addition, the driving circuit 2 of the display device according to the present invention includes a scan driving circuit 20 and a data driving circuit 30. The scan driving circuit 20 produces a plurality of scan signals for scanning the plurality of pixel structures 10 of the display panel 1. The data driving circuit 30 produces a plurality of data signals and transmits the plurality of data signals to the plurality of pixel structures 10 corresponding to the plurality of scan signals.

Figure 8B:
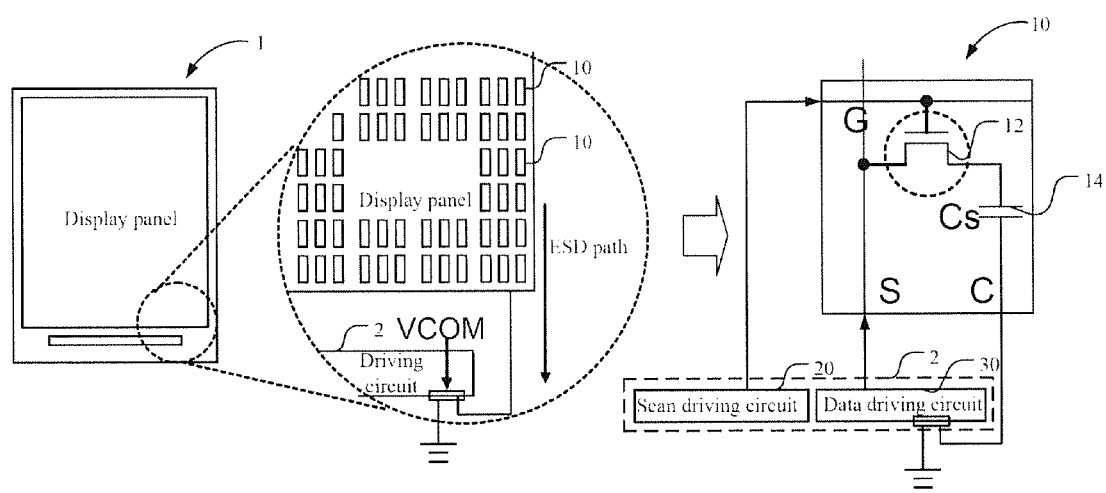
FIG. 8B shows a schematic diagram of the display panel according to another embodiment of the present invention.

FIG. 8B shows a schematic diagram of the display panel according to another embodiment of the present invention. As shown in the figure, the difference between the present embodiment and the one in FIG. 8A is that the common electrode COM of the plurality of pixel structures 10 according to the present embodiment is not coupled to the ground directly. Instead, it is coupled to the ground via the driving circuit 2. In other words, the common electrode COM of the plurality of pixel structures 10 of the display panel 1 is coupled to any ground of the driving circuit 2 for making the common voltage VCOM of the common electrode COM zero. Thereby, the electrostatic charges can be led to the ground directly for increasing the endurance on electrostatic charges.

Figure 9:
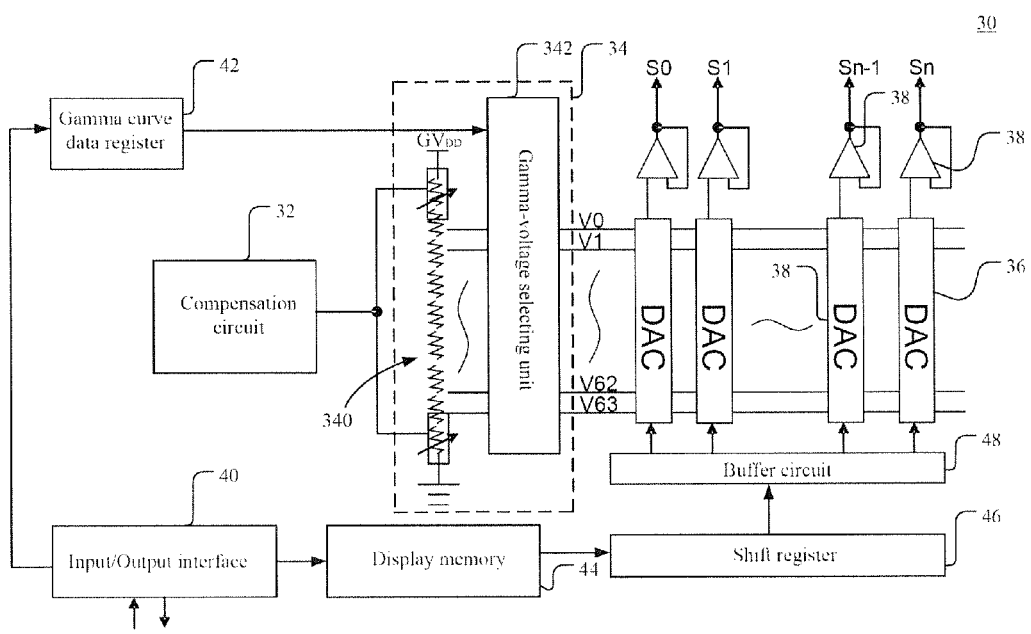
FIG. 9 shows a circuit diagram of the data driving circuit of the display panel according to an embodiment of the present invention.

FIG. 9 shows a circuit diagram of the data driving circuit of the display panel according to an embodiment of the present invention. As shown in the figure, the data driving circuit 30 of the display device according to the present invention comprises a compensation circuit 32, a gamma voltage generating circuit 34, a plurality of digital-to-analog converters (DACs) 36, and a plurality of buffer units 38. The compensation circuit 32 produces a compensation signal. The gamma voltage generating circuit 34 generates a plurality of gamma voltages according the compensation signal and gamma curve data. The compensation signal produced by the compensation circuit 32 is used for adjusting the signal levels of the plurality of gamma voltages output by the gamma voltage generating circuit 34, as shown in FIG. 10.

The plurality of DACs 36 select a portion of the plurality of gamma voltages according to a plurality of display signals. In other words, after the plurality of DACs 36 receive the display signals, respectively, they will determine to select one of the plurality of gamma voltages, respectively, according to the display signals and output the determined gamma voltage. For example, the gamma voltage generating circuit 34 generates 64 gamma voltages to the plurality of DACs 36. When the display signal received by the first DAC 36 is 15, the first DAC 36 will select the 15th gamma voltage for outputting. When the display signal received by the fifth DAC 36 is 55, the fifth DAC 36 will select the 55th gamma voltage for outputting.

The plurality of buffer units 38 correspond to the plurality of DACs 36 and produce a plurality of data signals according to the plurality of gamma voltages output by the plurality of DACs 36 for driving the display panel 1. Namely, the plurality of buffer units 38 are coupled to the plurality of DACs 36, respectively, for buffering the plurality of gamma voltages output by the plurality of DACs 36, and hence producing and outputting the plurality of data signals for driving the display panel 1. Accordingly, by using the compensation signal produced by the compensation circuit 32, the signal levels of the plurality of gamma voltages output by the gamma voltage generating circuit 34 can be adjusted. Thereby, as the scan signal is cut off and the storage voltage across the storage capacitor 14 is shifted downwards by a shift voltage Vsft owing to the parasitic capacitor, the storage voltage across the storage capacitor 14 is still symmetrical to the common voltage VCOM of the common electrode COM while displaying identical grayscale.

Figure 10:
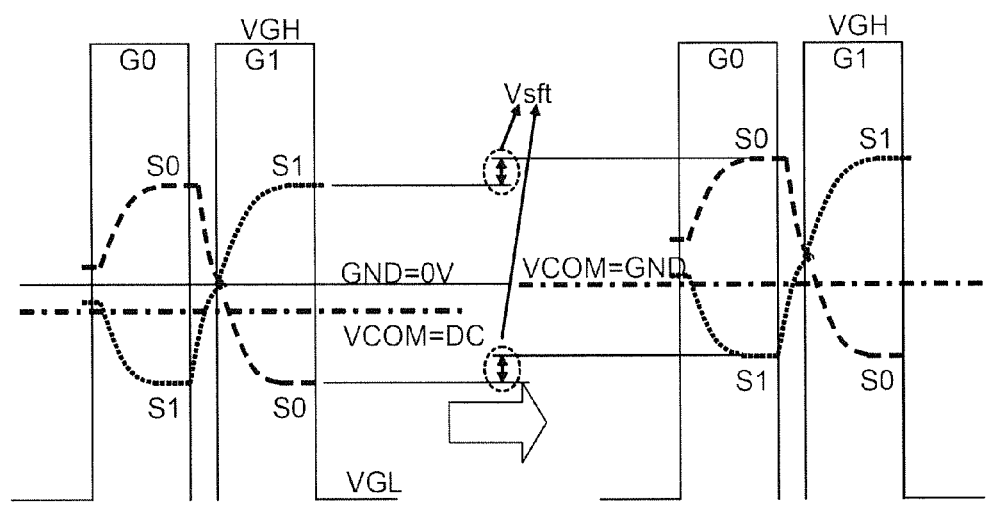
FIG. 10 shows waveforms of the driving signals of the display panel according to the present invention.

As shown in FIG. 10, as the scan signal is cut off, the storage voltage across the storage capacitor 14 is shifted downwards by a shift voltage Vsft owing to the parasitic capacitor. Besides, the common electrode COM of the plurality of pixel structures 10 according to the present embodiment is coupled to the ground. Thereby, the compensation signal produced by the compensation circuit 32 adjusts the signal levels of the plurality of gamma voltages and thus further adjusting the signal level of the data signal output by the data driving circuit 30. For example, the magnitude of compensation signal is the shift voltage Vsft. Then the signal levels of the plurality of gamma voltage are adjusted upwards or downwards by a shift voltage Vsft. When the scan signal is cut off and the storage voltage across the storage capacitor 14 is shifted downwards by a shift voltage Vsft owing to the parasitic capacitor, the storage voltage across the storage capacitor 14 is still symmetrical to the common voltage VCOM of the common electrode COM while displaying identical grayscale. Hence, according to the present invention, no extra reference voltage for the common electrode is required. Thereby, the circuit area, and hence the cost, can be reduced. In addition, the displaying quality can be enhanced by eliminating the influence of the switching of scan signal on the common electrode.

Refer again to FIG. 9. The gamma voltage generating circuit 34 according to the present invention comprises a voltage dividing circuit 340 and a gamma-voltage selection unit 342. The voltage dividing circuit 340 receives a power supply voltage $GV_{DD}$ and produces a plurality of voltage dividing signals according to the compensation signal. The gamma-voltage selection unit 342 is coupled to the voltage dividing circuit 340 and generating the plurality of gamma voltages by selecting a portion of the voltage dividing signal of the plurality of voltage dividing signals according to the gamma curve data.

Moreover, the data driving circuit 30 of the display panel 1 according to the present invention further includes an input/output interface 40, a gamma curve data register 42, a display memory 44, a shift register 46, and a buffer circuit 48. The input/output interface 40 receives the gamma curve data and the display signal. The gamma curve data register 42 is coupled to the input/output interface 40, registers the gamma curve data, and transmitting the gamma curve data to the gamma voltage generating circuit 34. The display memory 44 is coupled to the input/output interface 40 and stores the display signal. The shift register 46 is coupled to the display memory 44, and receives and shifts the display signal. The buffer circuit 48 is coupled to the shift register 46, buffers the display signal, and transmits the display signal to the plurality of DACs 36.

Figure 11:
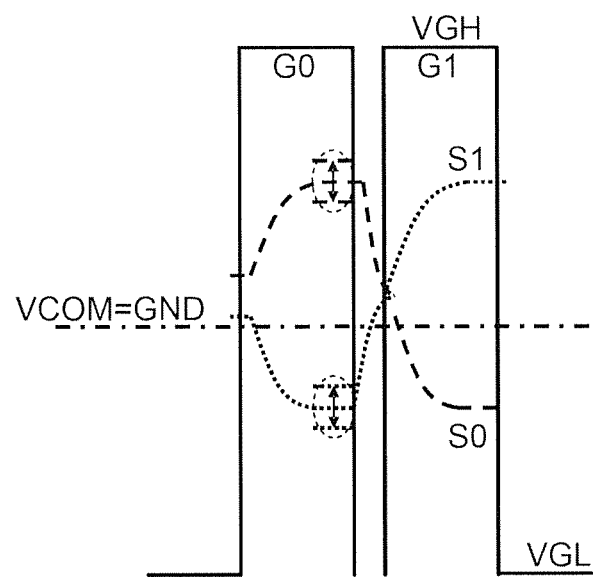
FIG. 11 shows the waveforms free of flash by using the driving signals of the display panel according to the present invention.

FIG. 11 shows the waveforms free of flash by using the driving signals of the display panel according to the present invention. As shown in the figure, the present embodiment includes waveforms of the embodiment of FIG. 9. By using the compensation circuit 32, the data driving circuit 30 according to the present embodiment controls the magnitude of the plurality of gamma voltages output by the gamma voltage generating circuit 34, and thus adjusting the magnitude of the data signals. Thereby, when the scan signal is cut off and the storage voltage across the storage capacitor 14 is shifted downwards by a shift voltage Vsft owing to the parasitic capacitor, the storage voltage across the storage capacitor 14 is still symmetrical to the common voltage VCOM of the common electrode COM while switching the levels of the scan signals and displaying identical grayscale. In other words, by using the compensation circuit 32, the data driving circuit 30 according to the present embodiment adjust slightly the magnitude of the data signals to make them symmetrical to the common voltage VCOM of the common electrode COM for eliminating the flash phenomenon.

Figure 12:
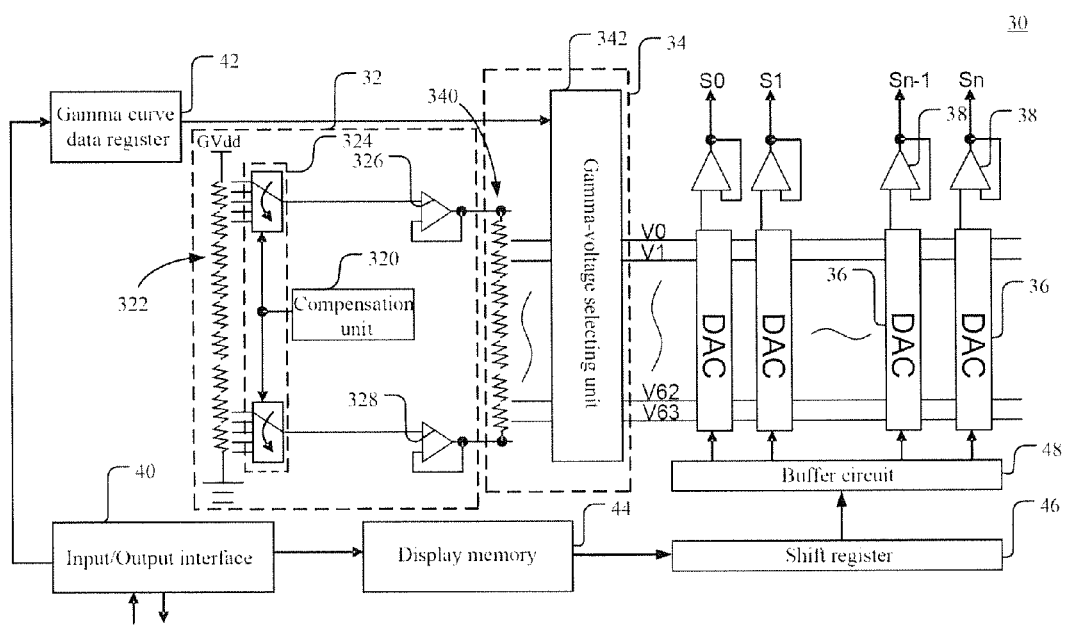
FIG. 12 shows a circuit diagram of the data driving circuit of the display panel according to another embodiment of the present invention.

FIG. 12 shows a circuit diagram of the driving circuit of the display panel according to another embodiment of the present invention. As shown in the figure, the difference between the present embodiment and the one in FIG. 9 is that the compensation circuit 32 according the present embodiment comprises a compensation unit 320, an adjusting circuit 322, and a switching circuit 324. The compensation unit 320 is used for producing a compensation signal. The adjusting circuit 322 receives a power supply voltage GVdd and dividing the voltage of the power supply voltage GVdd for producing a plurality of adjusting signal. The switching circuit 324 is coupled to the adjusting circuit 322. The switching circuit 324 selects the plurality of adjusting signals according to the compensation signal for producing a first reference voltage and a second reference voltage and transmits the first and second reference voltages to the gamma voltage generating circuit 34. Thereby, according to the present embodiment, by using the compensation signal produced by the compensation unit 32, the switching circuit 324 can select the plurality of adjusting signals produced by the adjusting circuit 322 for producing the first and second reference signals and thus adjusting the signal levels of the plurality of gamma voltages. Hence, the signal levels of the data signals output by the data driving circuit 30 can be adjusted as well. Accordingly, by using the compensation signal of the compensation unit 320, the signal level of the plurality of gamma voltages can be adjusted without requiring an extra reference voltage of common electrode. Thereby, the circuit area, and hence the cost, can be reduced.

In addition, the compensation circuit 32 according to the present embodiment further comprises a first amplifying unit 326 and a second amplifying unit 328. The first amplifying unit 326 is coupled to the switching circuit 324, and buffers the first reference voltage and transmits it to the voltage dividing circuit 340. The second amplifying unit 328 is coupled to the switching circuit 324, and buffers the second reference voltage and transmits it to the voltage dividing circuit 340. Then the voltage dividing circuit 340 divides the voltage difference between the first and second reference voltage and gives the plurality of voltage dividing signals.

Figure 13:
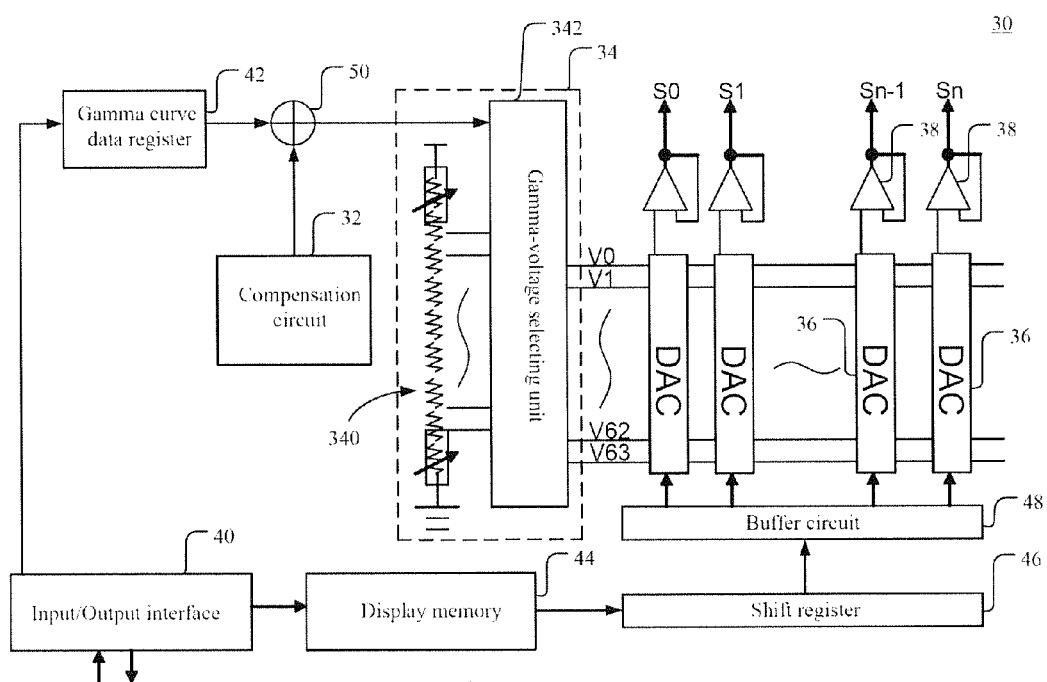
FIG. 13 shows a circuit diagram of the data driving circuit of the display panel according to still another embodiment of the present invention.

FIG. 13 shows a circuit diagram of the driving circuit of the display panel according to still another embodiment of the present invention. As shown in the figure, the difference between the present embodiment and the embodiments of FIGS. 9 and 12 is that the data driving circuit 30 according to the present embodiment 30 further includes an operational circuit 50, which is coupled to the gamma curve data register 42. The operational circuit 50 calculates the gamma curve data and the compensation signal, and produces an operational signal and transmits the operational signal to the gamma voltage generating circuit 34 for generating the plurality of gamma voltages. Namely, the compensation circuit 32 produces the compensation signal according to the magnitude of the downward shift voltage Vsft, which is coupled to the storage voltage across the storage capacitors 14 of the plurality of pixel structures 10 and caused by the parasitic capacitor of the transistors 12. Thereby, the operational circuit 50 first add the compensation signal to the gamma curve data. Then, as the scan signal is cut off and the storage voltage across the storage capacitor 14 is shifted downwards by a shift voltage Vsft owing to the parasitic capacitor, the storage voltage across the storage capacitor 14 is still symmetrical to the common voltage VCOM of the common electrode COM while displaying identical grayscale.

To sum up, a scan driving circuit of the driving circuit of the display panel according to the present invention produces a plurality of scan signal for scanning a plurality of pixel structures of the display panel. In addition, a data driving circuit produces a plurality of data signals corresponding to the plurality of scan signals and transmits the plurality of data signals to the plurality of pixel structures, where a common electrode of the plurality of pixel structures is coupled to a ground. Thereby, by coupling the common electrode of the plurality of pixel structures of the display panel to the ground, the voltage on the common electrode will not be influenced while the scan signal is switching and thus improving the displaying quality. Besides, by coupling the common electrode of the plurality of pixel structures of the display panel to the ground, electrostatic charges will be guided to the ground directly, hence increasing the endurance on electrostatic charges. Moreover, the data driving circuit according to the present invention adjusts the signal levels of a plurality of gamma voltages according to a compensation signal of a compensation circuit, and thus further adjusting the levels of the data signals. Accordingly, no extra reference voltage of the common electrode is required, leading to reduction in circuit area as well as cost.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A driving circuit of display panel, comprising:
   a scan driving circuit, producing a plurality of scan signals, and scanning a plurality of pixel structures of said display panel; and
   a data driving circuit, producing a plurality of data signals, and transmitting said plurality of data signals to said plurality of pixel structures when said plurality of pixel structures are scanned; wherein said data driving circuit comprises:
      a compensation circuit, producing a compensation signal;
      a gamma voltage generating circuit, generating a plurality of gamma voltages according to a gamma curve data; and
      a plurality of digital-to-analog converters, selecting a portion of said plurality of gamma voltages according to a plurality of display signals for producing said plurality of data signals to output and drive said display panel;
   wherein said gamma voltage generating circuit comprises:
      a voltage dividing circuit, producing a plurality of voltage dividing signals; and
      a gamma voltage selecting unit, coupled to said voltage dividing circuit, and selecting a portion of said plurality of voltage dividing signals according to said gamma curve data for generating said plurality of gamma voltages;
   where a common electrode of said plurality of pixel structures is coupled to a ground, said compensation signal of said compensation circuit is utilized for adjusting the signal levels of said plurality of gamma voltages.

2. The driving circuit of claim 1, wherein a ground of said driving circuit is coupled to a common electrode of said display panel.

3. The driving circuit of claim 1, wherein said data driving circuit further comprises a plurality of buffer units, corresponding said plurality of digital-to-analog converters, producing said plurality of data signals according to said plurality of gamma voltages output by said plurality of digital-to-analog converters for driving said display panel.

4. The driving circuit of claim 1, and further comprising:
   an input/output interface, receiving said gamma curve data and said display signals; and
   a gamma curve data register, coupled to said input/output interface, registering said gamma curve data, and transmitting said gamma curve data to said gamma voltage generating circuit.

5. The driving circuit of claim 4, and further comprising:
   a display memory, coupled to said input/output interface, and storing said display signals;
   a shift register, coupled to said display memory, and receiving and shifting said display signals; and a buffer circuit, coupled to said shift register, buffering and transmitting said display signals to said plurality of digital-to-analog converters.

6. The driving circuit of claim 1, wherein said compensation circuit comprises:
a compensation unit, producing said compensation signal;
an adjusting circuit, receiving a power supply voltage, and dividing said power supply voltage for producing a plurality of adjusting signals; and
a switching circuit, coupled to said adjusting circuit, selecting said plurality of adjusting signals according to said compensation signal for producing a first reference voltage and a second reference voltage, and transmitting said first reference voltage and said second reference voltage to said voltage dividing circuit so that said voltage dividing circuit producing said plurality of voltage dividing signals according to said first reference voltage and said second reference voltage.

7. The driving circuit of claim 6, wherein said gamma voltage generating circuit further comprises:
a first amplifying unit, coupled to said switching circuit, and buffering and transmitting said first reference voltage to said voltage dividing circuit; and
a second amplifying unit, coupled to said switching circuit, and buffering and transmitting said second reference voltage to said voltage dividing circuit.

8. A driving circuit of display panel, comprising:
a scan driving circuit, producing a plurality of scan signals, and scanning a plurality of pixel structures of said display panel; and
a data driving circuit, producing a plurality of data signals, and transmitting said plurality of data signals to said plurality of pixel structures when said plurality of pixel structures are scanned;
wherein said data driving circuit comprises:
a compensation circuit, producing a compensation signal;
an operational circuit, calculating a gamma curve data and said compensation signal for producing an operational signal;
a gamma voltage generating circuit, producing a plurality of voltage dividing signals, and selecting a portion of said plurality of voltage dividing signals according to said operational signal for generating a plurality of gamma voltages; and
a plurality of digital-to-analog converters, selecting a portion of said plurality of gamma voltages according to a plurality of display signals for producing said data signals to output and drive said display panel;
where a common electrode of said plurality of pixel structures is coupled to a ground, said compensation signal of said compensation circuit is utilized to adjust said gamma curve data for adjusting the signal levels of said plurality of gamma voltages.

9. A display panel, comprising:
a plurality of scan lines;
a plurality of data lines, interlaced with said plurality of scan lines, respectively; and
a plurality of pixel structures, located at the intersections of said plurality of scan lines and said plurality of data lines, respectively, coupled to said plurality of scan lines and said plurality of data lines, and a common electrode of said plurality of pixel structures coupled to a ground;
wherein said display panel is controlled by a data driving circuit, said data driving circuit comprises:
a compensation circuit, producing a compensation signal;
a gamma voltage generating circuit, producing a plurality of voltage dividing signals, and selecting a portion of said plurality of voltage dividing signals according to a gamma curve data for generating a plurality of gamma voltages, said compensation signal of said compensation circuit being utilized for adjusting the signal levels of said plurality of gamma voltages; and
a plurality of digital-to-analog converters, selecting a portion of said plurality of gamma voltages according to a plurality of display signals for outputting and driving said display panel.

10. The display panel of claim 9, wherein said pixel structure comprises a transistor, having a gate, a source, and a drain, said gate coupled to one of said plurality of scan lines, and said source coupled to one of said plurality of data lines.

11. The display panel of claim 10, wherein said source receives a data signal received by said data line.

12. The display panel of claim 9, wherein said common electrode is coupled to said ground via said data driving circuit.

* * * * *